(12) United States Patent  
Evansic (10) Patent No.: US 6,202,832 B1  
(45) Date of Patent: Mar. 20, 2001

(54) SPRING CONNECTION MECHANISM FOR VIBRATORY FEEDERS

(75) Inventor: Leonard Evansic, Graceton, PA (US)

(73) Assignee: FMC Corporation, Chicago, IL (US)

(*) Notice: Subject to any disclaimer, the term of this patent is extended or adjusted under 35 U.S.C. 154(b) by 0 days.

(21) Appl. No.: 09/320,053

(22) Filed: May 26, 1999

(51) Int. Cl.$^7$ ................................................. B65G 27/24
(52) U.S. Cl. ............................................................ 198/769
(58) Field of Search .............................................. 198/769

(56) References Cited

U.S. PATENT DOCUMENTS

| | | | | |
|---|---|---|---|---|
| 1,601,247 | * | 9/1926 | Garbarini. | |
| 2,098,034 | * | 11/1937 | Flint et al. | 198/56 |
| 2,481,131 | * | 9/1949 | Lindsay | 198/220 |
| 3,404,299 | * | 10/1968 | MacBlane | 310/17 |
| 3,845,857 | | 11/1974 | Doty. | |
| 4,121,708 | * | 10/1978 | Benson et al. | 198/766 |
| 4,813,532 | * | 3/1989 | Harper | 198/760 |
| 4,880,106 | * | 11/1989 | Falconer et al. | 198/763 |
| 5,285,890 | * | 2/1994 | Stearns | 198/766 |
| 5,287,027 | * | 2/1994 | Marshall et al. | 310/21 |
| 5,664,664 | * | 9/1997 | Gaines | 198/769 |
| 5,757,092 | * | 5/1998 | Graham | 310/15 |
| 5,821,657 | * | 10/1998 | Falconer et al. | 310/91 |
| 5,865,297 | * | 2/1999 | Chiba et al. | 198/751 |
| 5,931,286 | * | 8/1999 | Illi | 198/769 |
| 5,967,294 | * | 10/1999 | Patterson et al. | 198/763 |
| 6,019,216 | * | 2/2000 | Patterson | 198/752.1 |
| 6,041,915 | * | 3/2000 | Fishman et al. | 198/766 |
| 6,079,549 | * | 6/2000 | Meitinger | 198/751 |
| 6,079,550 | * | 6/2000 | Gilman | 198/769 |

* cited by examiner

Primary Examiner—James R. Bidwell  
(74) Attorney, Agent, or Firm—Rockey, Milnamow & Katz, Ltd.

(57) ABSTRACT

A vibratory conveying apparatus includes a trough operatively associated with a vibratory drive assembly for conveying pieces along the trough. The vibratory drive assembly includes a base member and a vibratory drive mounted to the base member. The trough is operatively associated with the vibratory drive to be driven into vibration substantially longitudinally with respect to the base member. First and second flexure members or bars extend longitudinally of the base member on opposite lateral sides of the base member, the bars connected at base ends to the base member. At least one leaf spring extends laterally across the base member, the leaf spring connected at opposite ends to distal ends of the bars and operatively connected at a center thereof to the trough. The flexure members provide increased flexibility at the leaf spring connections to increase useful spring life.

16 Claims, 7 Drawing Sheets

SPRING CONNECTION MECHANISM FOR VIBRATORY FEEDERS

TECHNICAL FIELD OF THE INVENTION

The invention relates to a vibratory feeder or conveyor that employs leaf springs. Particularly, the invention relates to an improved leaf spring connection for a vibratory feeder or conveyor, the feeder or conveyor having a base member and relatively reciprocating trough connected to the base member by the leaf springs.

BACKGROUND OF THE INVENTION

Vibratory feeders and conveyors are known which employ bar shaped leaf springs connecting a trough to a base member. The leaf springs in these feeders or conveyors may be mounted individually, or in banks of multiple leaf springs to meet the spring rate required by the design of the vibratory equipment. The leaf springs are known to be arranged such that one end of the bank of leaf springs is clamped to the conveying member, for example, the trough of the vibratory feeder, and the other end is clamped to the base member, or to the stationary member in the case of a single mass feeder design. In some designs, a center region of the bank of springs is clamped to structure of the conveying member of the feeder or conveyor, while the ends of the bank of leaf springs are clamped to structure of the base member, forming two spring bank sections.

A problem associated with these prior art designs is that as the spring bank is deflected, the leaf springs are required to elongate due to the geometry of the spring bank configuration. This elongation subjects the leaf springs to very high tensile stress as the leaf springs try to stretch. Also, as the feeder operates in each vibration cycle, the leaf springs are required to first deflect, in a characteristic "S" shaped form, in one direction, then to return to pass through a neutral position, and then to deflect in the opposite direction, and then to return to the neutral position once again to complete the cycle. Thus, with each cycle, the leaf springs experience a fully reversing stress which is detrimental to the useful life of the leaf springs.

The generated forces acting along a spring axis are directed to urge the leaf springs in the spring bank to slip in their clamped connection during some stage of deflection. If the clamping force at the clamped connection is increased to prevent such slippage at this stage of deflection, the resulting tensile stress, combined with the increased bending stress of the spring, particularly at the stress riser location formed where the spring is clamped, is often sufficient to cause a premature failure of a leaf spring as it is deflected back and forth.

There have been some prior art attempts to alleviate the design problem discussed in the previous paragraph, by fixing one end of the leaf springs, say to the base member of the conveyor or feeder, and allowing the other end of the spring to rotate. U.S. Pat. No. 3,845,857 discloses an arrangement of a single mass vibratory feeder wherein one end of a spring bank is connected to a rod mounted in an elastomer bushing such that as the spring element are deflected, the bushing yields, allowing the spring ends to move to provide a substantially simple deflection of the spring. This connection avoids the "S" shape form characteristic of deflecting a leaf spring that is fixed at both ends. While this spring mounting means may reduce the spring stresses involved in the deflection, the resultant spring rate would be reduced to an extent that would make the system impractical for large feeders.

SUMMARY OF THE INVENTION

The present invention contemplates a vibratory conveying apparatus, such as a conveyor or feeder, having a vibratory drive assembly and a trough. The trough is connected to a base member of the vibratory drive assembly via a leaf spring assembly. The leaf spring assembly has an improved spring connection configuration located between the trough and the base member to decrease stress on a leaf spring or springs of the leaf spring assembly to increase the useful life of the leaf spring assembly, while still providing an effective spring rate.

The apparatus includes a vibratory drive arranged between the base member and the trough. The vibratory drive can be an electromagnetic driver, a rotating eccentric weight driver, a rotating crank arm driver, or other type of drive which acts directly on the trough, or acts to indirectly induce vibration through the spring assembly, such as in a base excited conveyor.

The leaf spring assembly preferably includes a plurality of leaf springs stacked together in a spring bank, although a leaf spring assembly having a single leaf spring is also encompassed by the invention. Where a plurality of leaf springs are employed, the springs can be separated by spacers.

In a preferred embodiment, the leaf springs are arranged in a bank and extend substantially perpendicularly to a first direction of vibratory movement of the trough. The leaf springs are connected at a first region to a flexure member and at a second region to structure of the trough. The flexure member is elongated in the first direction, having a base end fastened to the base member and a distal end connected to the leaf springs. The flexure member can flex laterally at its distal end in response to flexing force from the leaf springs.

Preferably, the first region is one end of the leaf springs and the second region is a center region of double length leaf springs. The leaf springs can also include a third region at an opposite end of the double length leaf springs. A second flexure member is connected at its base end to the base member and at its distal end to the third region. The first and second flexure members are configured and arranged in mirror image fashion on opposite lateral sides of the base member.

Each flexure member includes a substantially plate shaped bar member extending substantially along its length from the base end to the distal end. The flexure member includes a clamp element or clamp block connected to the distal end of the bar member. The bar member and the clamp element include openings in registry for accepting one or more leaf spring elements. A fastener proceeds into the distal end of the clamp element to be advanced along the first direction to abut the leaf spring(s) and press the leaf spring(s) against an end surface of the opening to clamp the spring(s) into the clamp element.

The spring attachment mechanism of the present invention is an improvement over the prior known arrangement in that it lowers the spring stresses while maintaining high spring rates for practical designs of large two mass vibratory feeders and conveyors. According to the preferred embodiments of the invention, the characteristic "S" shape form of the deflected leaf spring is retained.

The invention provides an improved means to mount and connect leaf springs used in vibratory feeders and conveyors such that combined tension and bending stresses are minimized. These lower stresses prevent premature spring failure which allows higher vibration strokes than feeders and conveyors using conventional spring clamping methods. The attachment mechanism accommodates a high system spring rate to keep the number and the size of the springs within practical limits.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Figure 1:
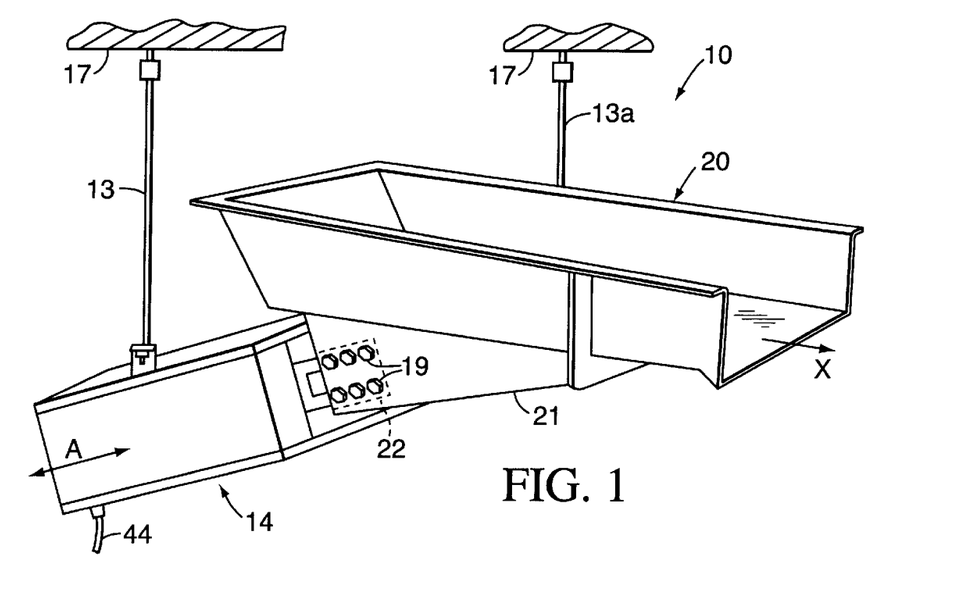
FIG. 1 is a perspective view of a vibratory conveying apparatus utilizing a vibratory drive assembly of the present invention.

FIG. 1 illustrates a conveying apparatus 10 of the present invention. The apparatus 10 can be a vibratory conveyor or feeder. The apparatus includes a trough 20 for holding pieces to be conveyed in the direction X. A vibratory drive assembly 14 (described below) is connected to the trough 20 and can be hung via one or more rods 13 from a support structure 17, for example, in the case of a single mass feeder or conveyor. The trough 20 can also be supported from the support structure 17 via one or more rods 13a. Power is supplied to a vibratory drive 34 (described below) located within the drive assembly 14, via an electric power cord 44, to drive the trough into vibration along the axis A.

Figure 2:
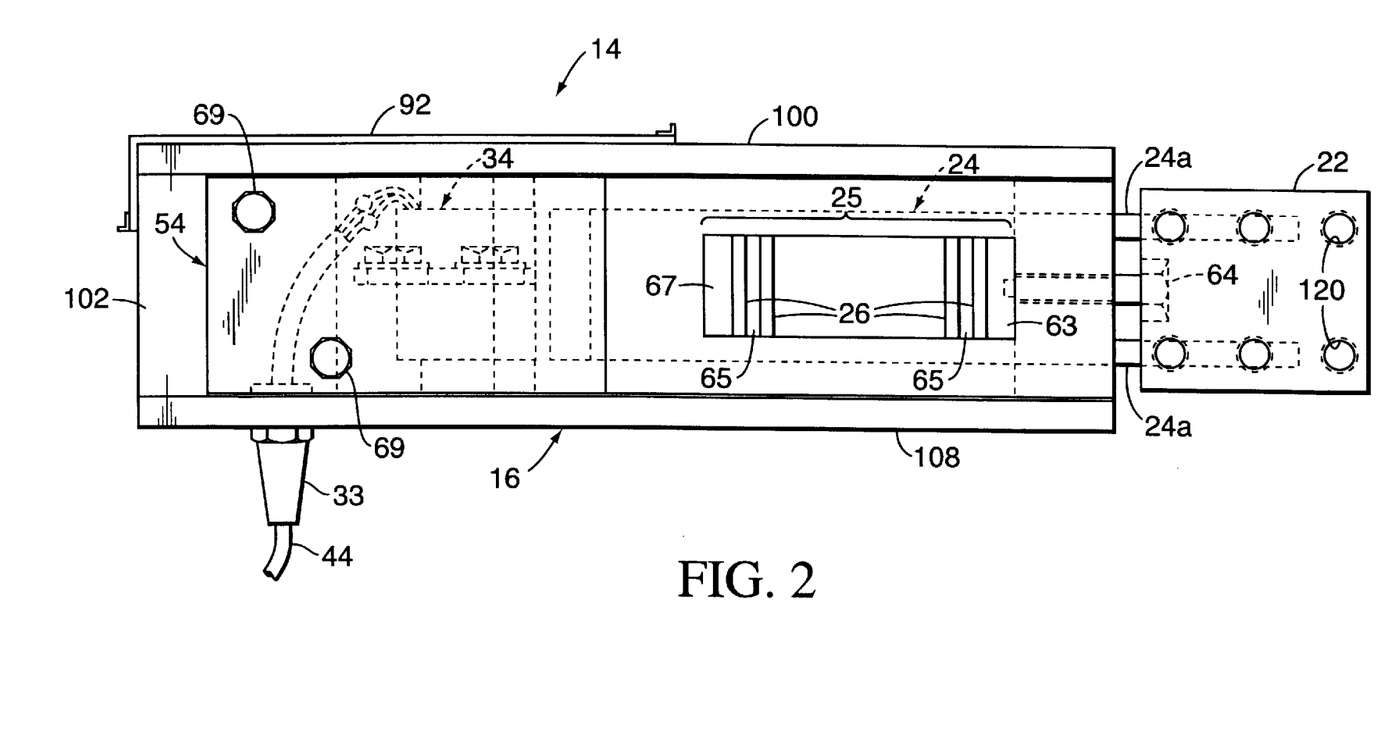
FIG. 2 is an enlarged elevational view of the vibratory drive assembly shown in FIG. 1.

The trough 20 is connected to the drive assembly 14 by means of one or more trough brackets 21 connected by fasteners 19 to one or more connector brackets 22 (shown in FIG. 2). The connector brackets 22 are connected to the vibratory drive assembly 14.

FIG. 2 illustrates the vibratory drive assembly 14. The assembly includes a base member in the form of a base assembly 16. The base assembly 16 is supported from the structure 17 by the rod(s) 13, as shown in FIG. 1. The connector brackets 22 are connected to a trough frame or chassis 24 via four extending arms 24a (two shown in FIG. 2). The trough chassis 24 is supported by a bank 25 of leaf springs 26.

The electric power cord 44 is passed through a rubber strain relief bushing 33, fastened to the base assembly 16, to protect the cord from pulling loose or fraying.

The base assembly 16 is described below with respect to FIGS. 4A through 4C. The base assembly 16 forms a substantially enclosed space for the chassis 24 and the vibratory drive 34. The enclosure is formed by a cover plate 92, a top plate 100, a base plate 108, a back plate 102 and two flexure members 54 (described below). The connector brackets 22 are each welded or otherwise connected to two of the four extending arms 24a of the chassis. The brackets 22 each include six threaded holes 120 for receiving the fasteners 19, to connect each of the trough brackets 21 to one of the connector brackets 22.

Figure 3:
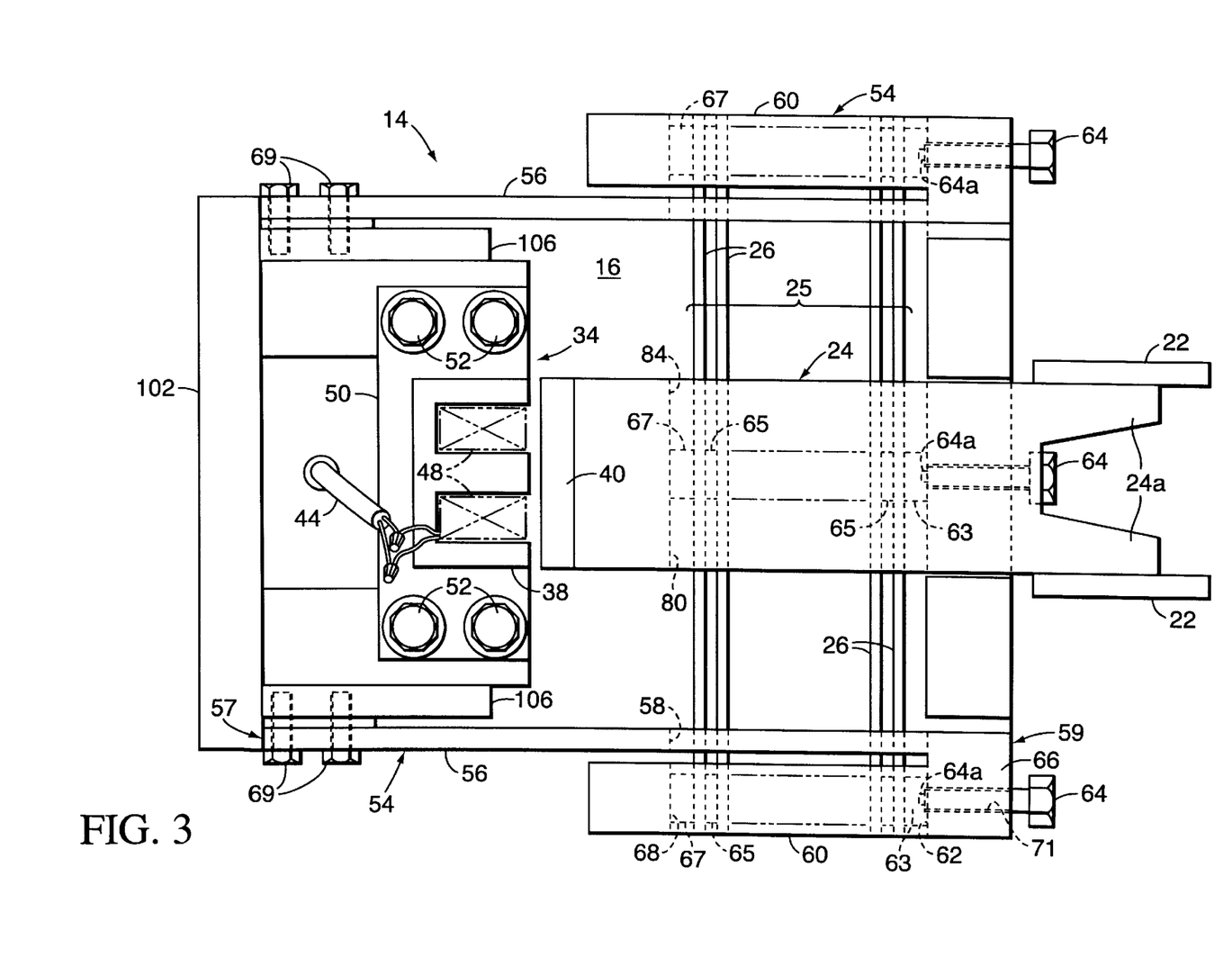
FIG. 3 is an elevational view of the drive assembly of FIG. 2.

FIG. 3 illustrates the vibratory drive assembly 14. The cover plate 92 and the top plate 100 are removed for clarity of description. The vibratory drive 34 is mounted to the base assembly 16 and operates to impart vibration between the base assembly 16 and the trough 20. The vibratory drive 34 includes an electromagnet 38 having an electromagnetic coil 48. The trough chassis 24 includes an armature 40 in close proximity to the electromagnetic coil 48 such that an oscillating magnetic field in the coil 48 causes the armature 40 to be repetitively drawn toward and then released from the coil 48. The electric power cord 44 conducts electric power to the coil 48. The electromagnet 38 is mounted to the base assembly 16 via a mounting bracket 50 and fasteners 52.

The leaf springs 26 are connected at opposite ends to respective flexure members 54. Each flexure member 54 includes an elongated bar element 56 having a base end 57 and a distal end 59. The base end 57 of the bar element 56 is fastened by fasteners 69 to respective side members 106 (described below) of the base assembly 16. Connected at the distal end 59 is a block-shaped clamp element 60. The bar element 56 includes a bar window or opening 58 adjacent to its distal end 59. The clamp element 60 extends in a direction from the distal end 59 of the bar element 56 back toward the base end 57 of the bar element 56. The clamp element 60 includes a clamp window or opening 62 which is in registry with the bar window 58 of the bar element 56.

A clamp fastener 64 extends through a front wall portion 66 of the clamp element 60, threaded into a threaded bore 71. The clamp fastener 64 extends into the window 62 when the clamp fastener 64 is advanced in the element 60. The fastener 64 has a protrusion 64a that presses against a clamp block 63 which presses against the plurality of springs 26. The springs 26 can be spaced apart by interleaved spacers 65. The bank of springs 25 is clamped tightly within the window 62 against a stop block 67 which is pressed to an end surface 68 of the clamp window 62. The bank of springs 25 passes loosely through the bar window 58.

The chassis 24 includes a transverse slot or opening 80. The springs 26 extend through the opening 80. A stop block 67, a clamp block 63 and spacers 65 between adjacent springs 26, are arranged within the opening 80. A further clamp fastener 64 extends through a front wall portion 86 of the chassis 24. Advancement of the further clamp fastener 64 through the front wall portion 86 presses the clamp block 63 into the bank of springs 25 against the clamp block 67 which itself abuts an end surface 84 of the chassis 24. Thus, the springs are tightly clamped at each of the flexure members 54 and at a center region thereof within the chassis 24.

Figure 4A:
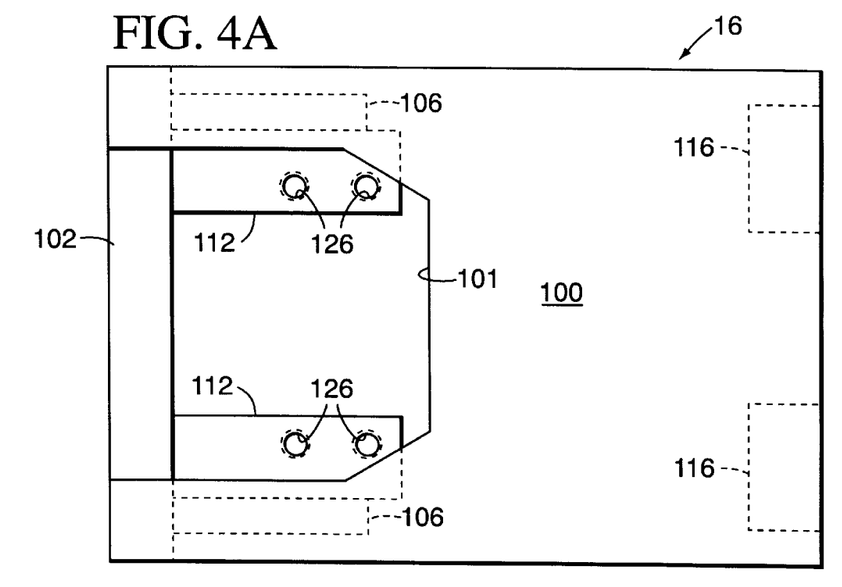
FIG. 4A is a plan view of a base member of the assembly of FIG. 2.
Figure 4B:
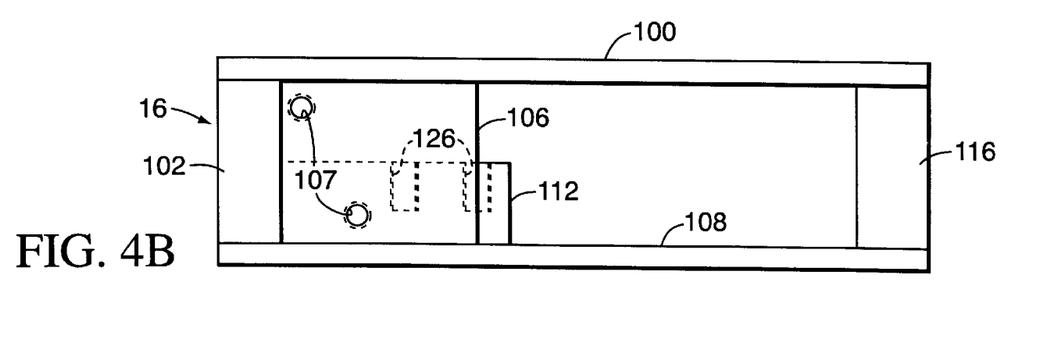
FIG. 4B is an elevational view of the base member of FIG. 4A.
Figure 4C:
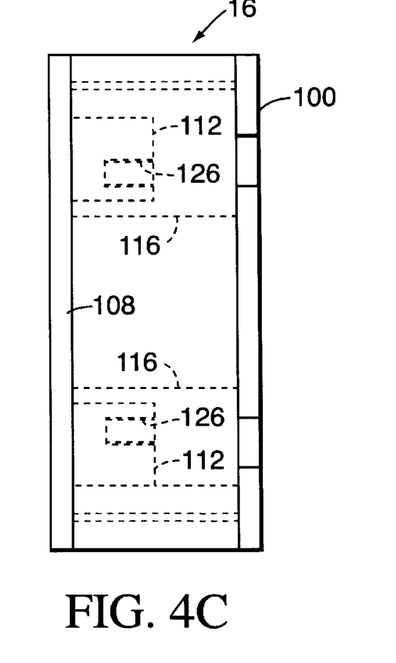
FIG. 4C is an end view of the base member of FIG. 4A.

FIGS. 4A and 4B illustrate the base assembly 16 of the apparatus. The base assembly includes the top plate 100 supported from the base plate 108 by the back plate member 102, the two side members 106 and two front support members 116. The top plate 100 includes an access opening 101 above the vibratory drive 34, for maintenance access. The access opening 101 is closed by the cover plate 92, as shown in FIG. 2. The side members 106 include threaded holes 107 for receiving the fasteners 69, as shown in FIG. 2. Extending upwardly from the base plate 108 are two electromagnet support blocks 112, which support the mounting bracket 50, each of which contain bracket mounting holes 126 which are threaded to receive the fasteners 52.

Figure 5A:
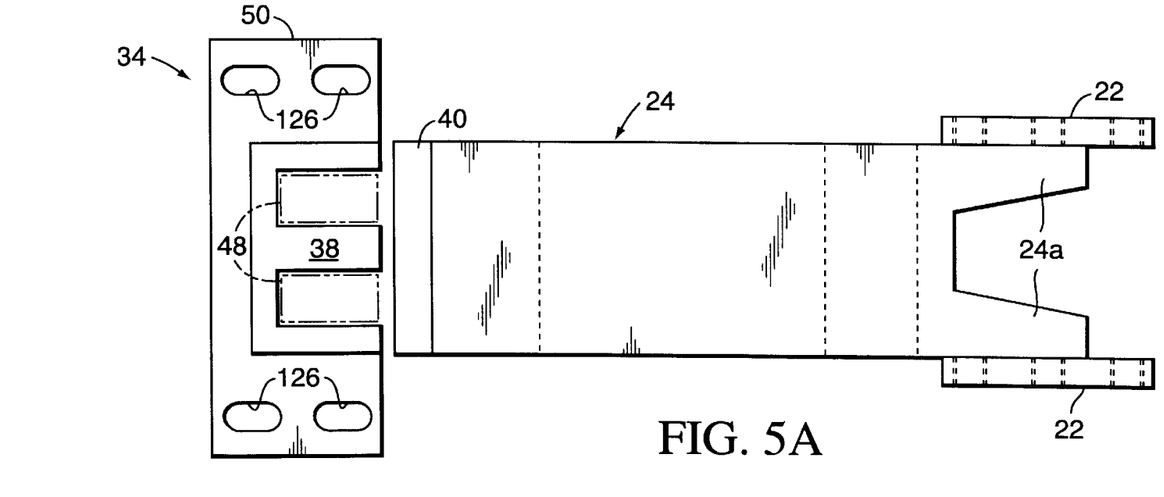
FIG. 5A is a plan view of vibratory components of the assembly of FIG. 2.
Figure 5B:
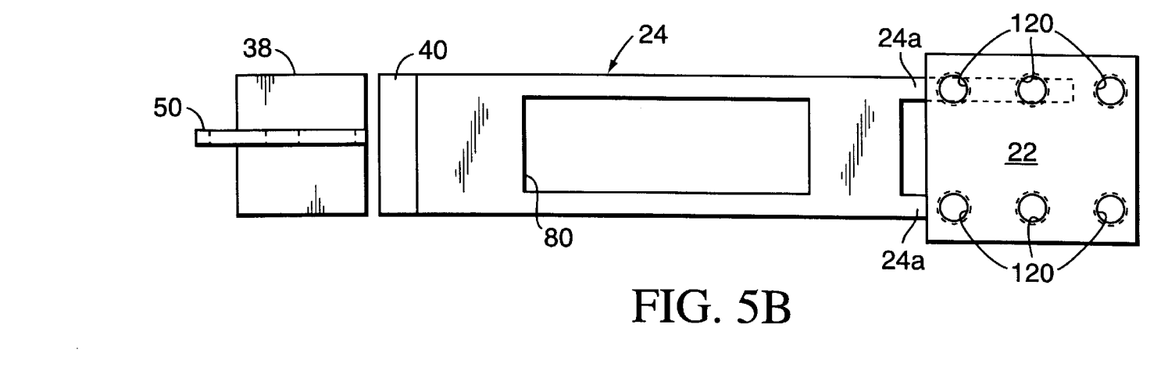
FIG. 5B is an elevational view of the vibratory components of FIG. 5A.

FIGS. 5A and 5B illustrate the vibratory driver 34 arranged adjacent to the armature 40. The electromagnet mounting plate 50 includes four fasteners holes 126 which are elongated longitudinally in order to precisely set the distance of the electromagnetic coil 48 to the armature 40.

Figure 6A:
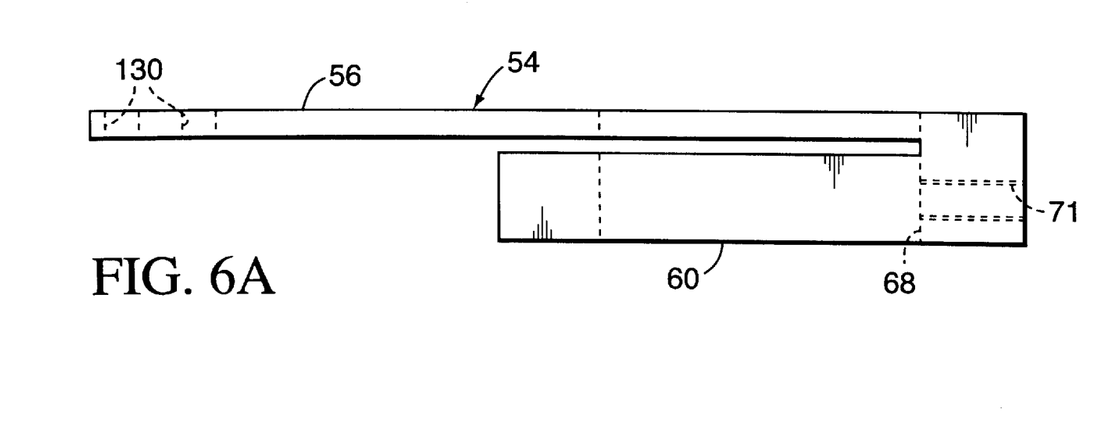
FIG. 6A is a plan view of a flexure member of the assembly of FIG. 2.
Figure 6B:
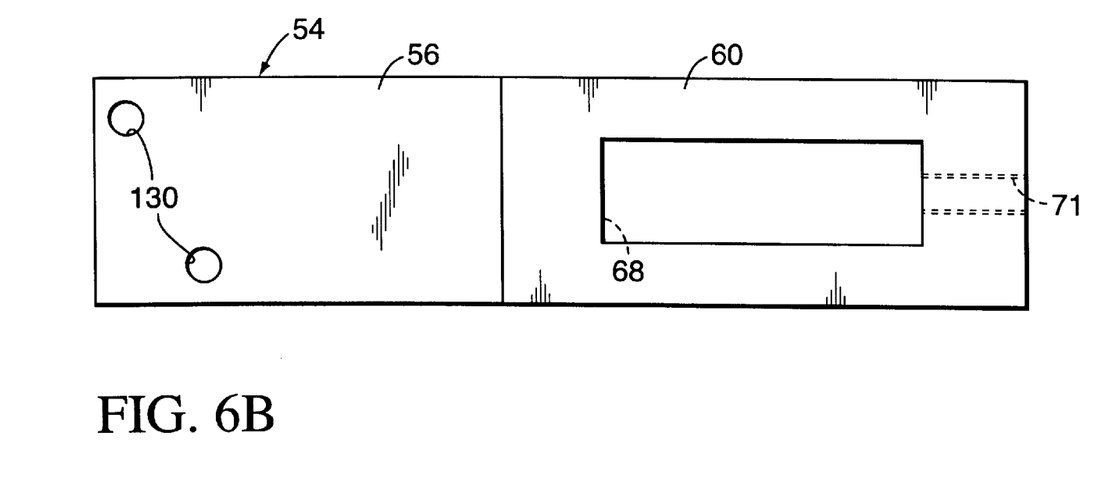
FIG. 6B is an elevational view of the flexure member of FIG. 6A.

FIGS. 6A and 6B illustrate the flexure member 54 in more detail including the rectangular clamp window 62 which is open to the threaded bore 71. The flexure member mounting holes 130 are used to receive the fasteners 69.

Figure 7:
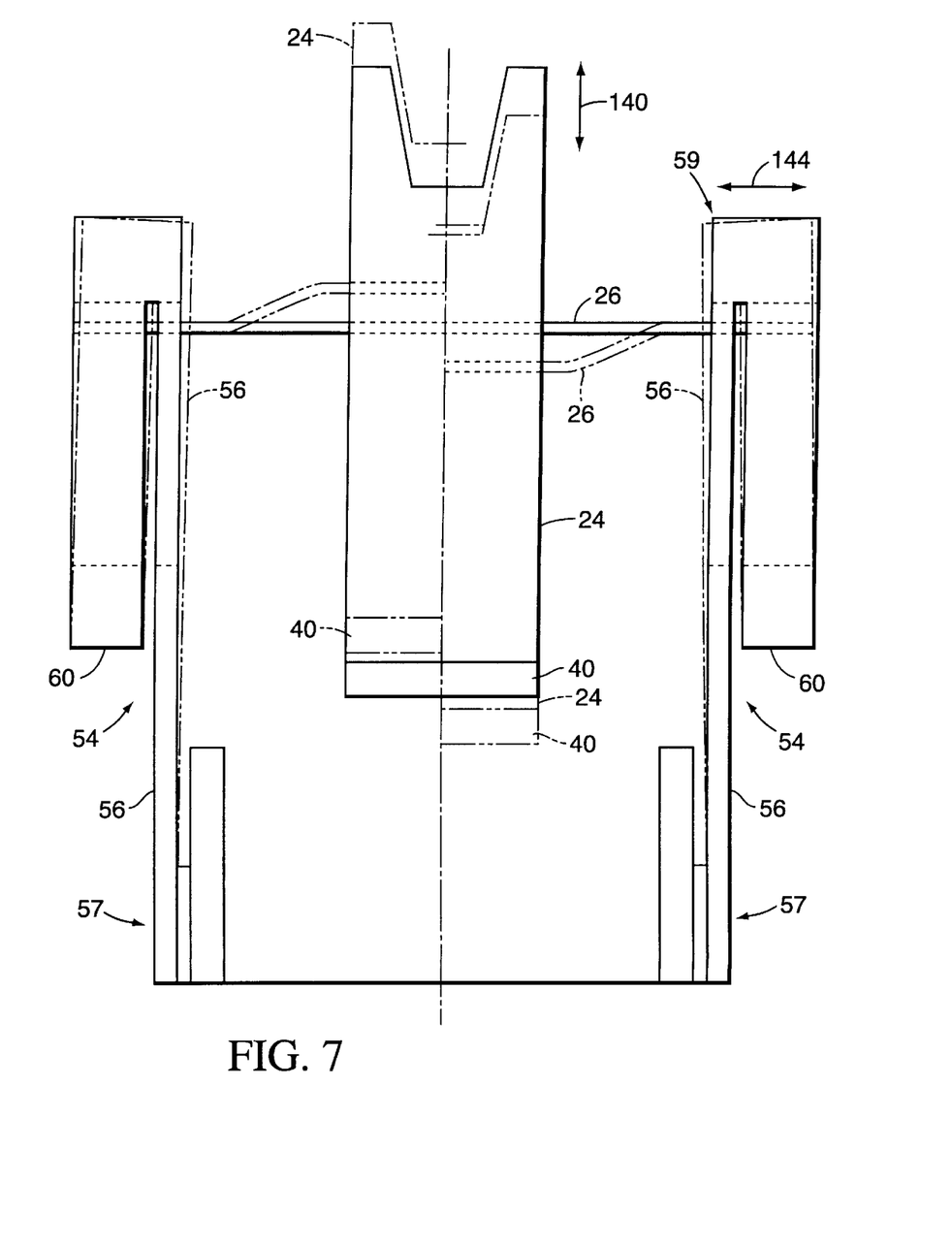
FIG. 7 is a schematic plan view of the assembly of FIG. 2.

FIG. 7 illustrates the vibrational behavior of the trough chassis 24, the spring bank 25 and the flexure members 54 during operation of the apparatus. Although only one double length spring 26 is shown for simplicity, the behavior of all of the leaf springs 26 of the bank 25 would be similar. As the apparatus operates, in each vibration cycle each of the springs 26 first deflects from a neutral position to its characteristic "S" shaped form, in one direction, returns to pass through the same neutral position, and then deflects in the opposite direction, and then returns to the neutral position to complete the cycle. As the spring bank 25 is deflected, the tension, due to the spring elements trying to elongate, and the axial bending strain, produce a force whereby the elongated bar element 56 of the flexure member 54 deflects along its own "S" shaped path in the direction defined by the arrows 144. The selected spring rate of the flexure member 54 limits the combined stress level in the spring system 26 to be within safe design values for long spring life, but at the same time is sufficiently stiff to provide a resultant spring rate to handle the trough weights of the largest of vibratory feeders or conveyors, without the spring system slipping in the spring clamp elements 60.

The dashed lines on the right side of FIG. 7 indicate the displacement of the chassis 24 and the deflection of the spring 26 as the armature 40 is being attracted to the core of the electromagnet 38 when electric power is applied to the magnetic coil 48. The dashed lines on the left side of FIG. 7 indicate the displacement of the chassis and the deflection of the spring 26 after the armature 40 is released by the electromagnet 38 and has moved by spring force. The arrows 140 indicate the direction of the displacement of the armature 40 and the trough chassis 24 during operation. The arrows 144 indicate the direction of the displacement of the spring and clamping flexure member 54 as the spring 26 is deflected in the characteristic "S" shaped form, as indicated by the dashed lines.

In the illustrated embodiment, the conveying apparatus is powered by an electromagnet. It is not intended to limit the invention to single mass or two mass electromagnetic feeders as it will be readily understood by those skilled in the art that the invention would be useful over a broad range of vibratory feeders and conveyor designs employing leaf springs. Any drive means that can cause the trough 20 to reciprocate back and forth in the direction of the arrows 140, such as rotating eccentric weights, rotating crank arms, and the like, may also be employed and are encompassed by the invention, regardless of any geometry differences and in the placement or arrangement of the component parts. The geometry of the flexure members 54 might also be varied to suit individual feeder or conveyor designs without departing from the principles of the invention.

Figure 8:
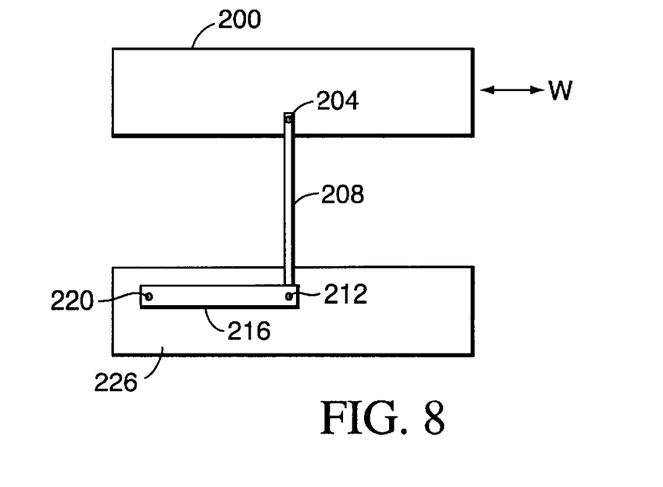
FIG. 8 is a schematic view of an alternate embodiment of the invention.

FIG. 8 illustrates the principles of the invention schematically. A first structure 200, such as a trough, is connected at a connection 204 to a leaf spring 208. The connection 204 is preferably a stack of spring bars. The spring is connected at a connection 212 to a flexure member 216. The connection is preferably a clamped connection. The flexure member 216 is preferably a bar member. The flexure member 216 is connected at a connection 220 to a second structure 226 such as a base. The connection 220 can be a bolted connection. The length of the spring 208 is preferably arranged at about 90° to the longitudinal axis of the flexure member 216, although the invention is not limited to that angle as other angles would be operational and are encompassed by the invention. The apparatus shown in FIG. 8 could be turned upside down with the second structure 226 being the trough and the first structure 200 being the base. The first structure 200 and the second structure 226 are reciprocated relative to each other along the direction W.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A vibratory conveying apparatus, comprising:
   a base member;
   a vibratory drive mounted to said base member;
   a trough operatively associated with said vibratory drive to be driven into vibration longitudinally with respect to said base member,
   first and second bars each extending longitudinally between base and distal ends, of said base member on opposite lateral sides of said base member, said bars connected at said base ends to said base member; and
   at least one leaf spring extending laterally across said base member, said leaf spring connected at opposite ends of said leaf spring to said distal ends of said bars and operatively connected at a center thereof to said trough each of said bars having a lateral flexibility between said base end and said distal end thereof.

2. The apparatus according to claim 1, wherein said bars each include a clamping element at said distal ends, said leaf spring being clamped to said bars at said clamping element.

3. The apparatus according to claim 1 comprising a plurality of leaf springs and a plurality of spacers, adjacent ones of said leaf springs separated at said opposite ends by said spacers.

4. The apparatus according to claim 1, wherein said bars each include a clamping element at said distal ends, and said leaf spring is clamped to said bars at said clamping element, wherein said clamping elements each comprise a blockshaped element extending parallel to said respective bar and having a base end connected to said distal end of said bar and a distal end extending toward said base end of said bar, said clamping element and said bar having openings therethrough that are in registry for receiving said leaf spring, and said block-shaped element having a threaded opening in said base end thereof which extends into said opening for receiving a fastener which abuts said leaf spring to clamp said leaf spring against said block-shaped element.

5. The apparatus according to claim 4, comprising a trough chassis connected to said trough and which includes a lateral opening therethrough for allowing said leaf spring to penetrate through said chassis, and a threaded opening through an end face of said chassis, said threaded opening open into said lateral opening for receiving a threaded fastener therein for clamping said leaf spring to said trough chassis.

6. The apparatus according to claim 1, wherein said vibratory drive includes an electromagnet mounted to said base member and an armature mounted to said trough in close proximity to said electromagnet.

7. The apparatus according to claim 1, comprising two block-shaped clamping elements, one of which is fixed to a distal end of each of said bars, each bar and clamping element pair having windows therethrough in registry, said leaf spring received into said windows of said bars and said clamping elements, and including two clamping fasteners, each fastener protruding through a front wall portion of one block-shaped clamping element to pressingly capture said leaf spring against a wall of said window of said clamping element.

8. A vibratory conveying apparatus, comprising:

a base member;

a vibratory exciter supported on said base member;

a vibratory output member that is vibrated with respect to said base member by said vibratory exciter;

a first bar extending longitudinally of said base member between a base end and a distal end thereof and connected at base end thereof to said base member;

a second bar extending longitudinally of said base member between a base end and a distal end thereof and connected at base end thereof to said base member;

a leaf spring arranged across said base member and connected to distal ends of said first and second bars, each of said bars having a lateral flexibility between said base end and said distal end thereof; and said output member connected to a central area of said leaf spring.

9. The apparatus according to claim 8 further comprising a trough connected to said output member.

10. The apparatus according to claim 8, comprising a plurality of additional leaf springs arranged across said base member and connected to distal ends of said first and second bars, and a plurality of spacers, and adjacent ones of said plurality of additional leaf springs are separated by spacers, said output member connected to a central area of said plurality of additional leaf springs.

11. The apparatus according to claim 8, wherein said bars and said output member include spring openings in registry for accepting said leaf spring laterally across said base member, and three clamp mechanisms for clamping the leaf spring at opposite ends to said bars and at a central region to said output member.

12. The apparatus according to claim 11, wherein said three clamp mechanisms each include a structure adjacent to each of said spring openings, each of said structures having a threaded aperture open into a respective spring opening, and a threaded fastener threaded into said threaded aperture, and protruding into said respective spring opening.

13. A vibratory conveying apparatus, comprising:

a base member;

a trough elongated longitudinally;

at least one elongated flexure member having a base end and a distal end; and at least one leaf spring having a first end and a second end, and extending at an angle to said elongated flexure member and connected at said first end thereof to said distal end of said elongated flexure member, said flexure member and said leaf spring connected in series between said base member and said trough at said base end and said second end.

14. The conveying apparatus according to claim 13, wherein said flexure member base end is connected to said base member, and said leaf spring second end is connected to said trough.

15. The conveying apparatus according to claim 13, comprising a plurality of leaf springs, wherein said leaf spring is one member of said plurality of leaf springs, said plurality of leaf springs stacked to form a bank of leaf springs.

16. The conveying apparatus according to claim 15, wherein said flexure member is connected to said base member by fasteners at said base end thereof, at the distal end of said flexure member includes a clamping element for clamping said first ends of said plurality of leaf springs.

* * * * *